May 14, 1929.  J. COUFAL  1,713,423
LOCK FOR AUTOMOBILE STEERING WHEELS
Filed May 17, 1928  2 Sheets-Sheet 1

INVENTOR.
J. Coufal.
BY
Bryant+Lowry
ATTORNEYS

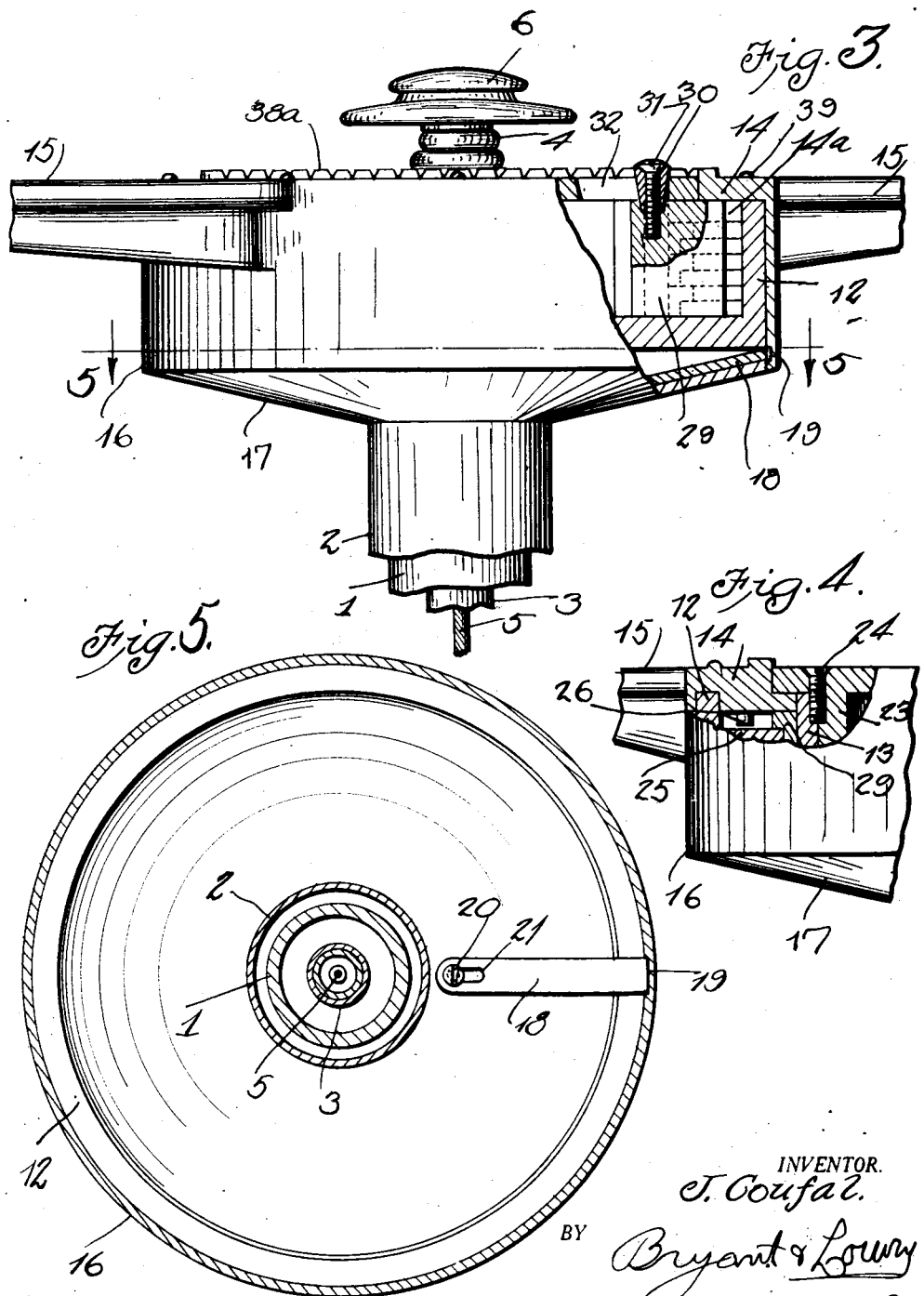

Patented May 14, 1929.

1,713,423

UNITED STATES PATENT OFFICE.

JOHN COUFAL, OF BOMARTON, TEXAS.

LOCK FOR AUTOMOBILE STEERING WHEELS.

Application filed May 17, 1928. Serial No. 278,443.

This invention relates to certain new and useful improvements in locks for automobile steering wheels.

The primary object of the invention is to provide a lock for the steering wheel of an automobile wherein a lock of the permutation type comprising a multiplicity of ring tumblers is operable to permit free rotation of the steering wheel upon a steering column and being further operable for locking the steering wheel to the column or post.

More specifically, this invention relates to certain new and useful improvements over the patent granted to John Coufal, on December 27th, 1927, No. 1,654,456 and has particular reference to that portion of the lock mechanism which comprises the sliding block or key for the ring tumbler.

With the above and other objects in view that will become apparent as the nature of the invention is better understood, the same consists in the novel form, combination and arrangement of parts hereinafter more fully described, shown in the accompanying drawings and claimed.

In the drawings:—

Figure 3 is a side elevational view, partly in section showing the key for the ring tumblers in its shifted tumbler locking position;

Figure 4 is a fragmentary side elevational view, partly in section showing a coupling screw for connecting parts of the lock casing together; and Figure 5 is a cross-sectional view taken on line 5—5 of Figure 3, showing the locking or retaining arm for the bottom finishing or face plate of the lock casing.

Figure 1:
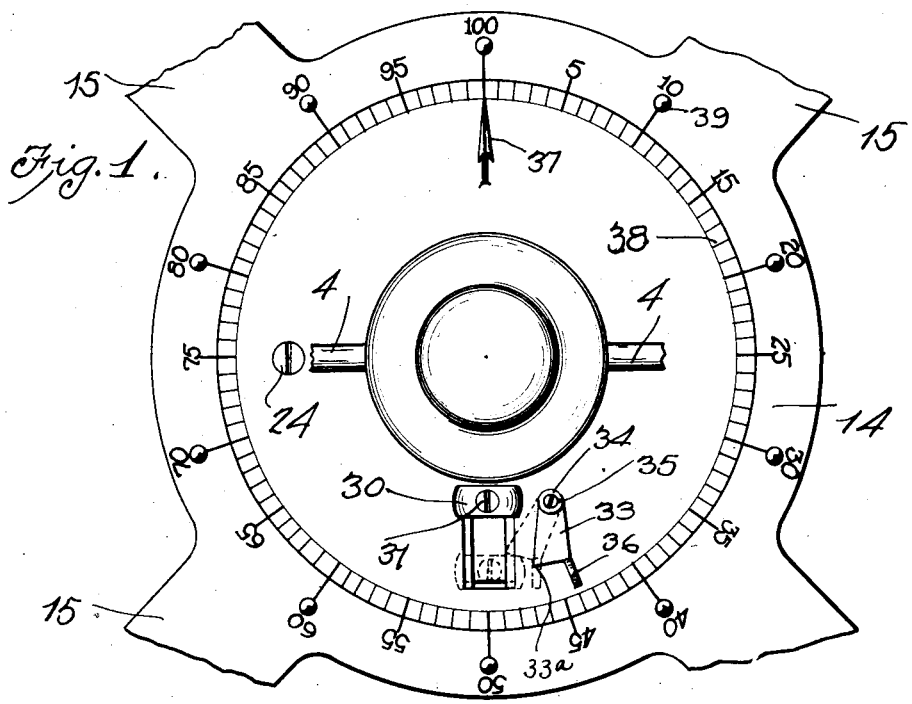
Figure 1 is a top plan view illustrating the hub portion of an automobile steering wheel showing the dial for the permutation lock mechanism on the steering wheel hub and also the latch device for holding the locking key of the ring tumblers in its operative position.

The steering wheel is mounted upon the steering post 1 enclosed within the steering column 2 while the inner concentric tubular members or shafts 3 that are associated with the usual gas and spark operating devices at their lower ends have corresponding control levers 4 associated with their upper ends, the wire 5 threaded through the tubular shafts 3 being in circuit with a source of electric energy and a signal, and also the control button 6.

Figure 2:
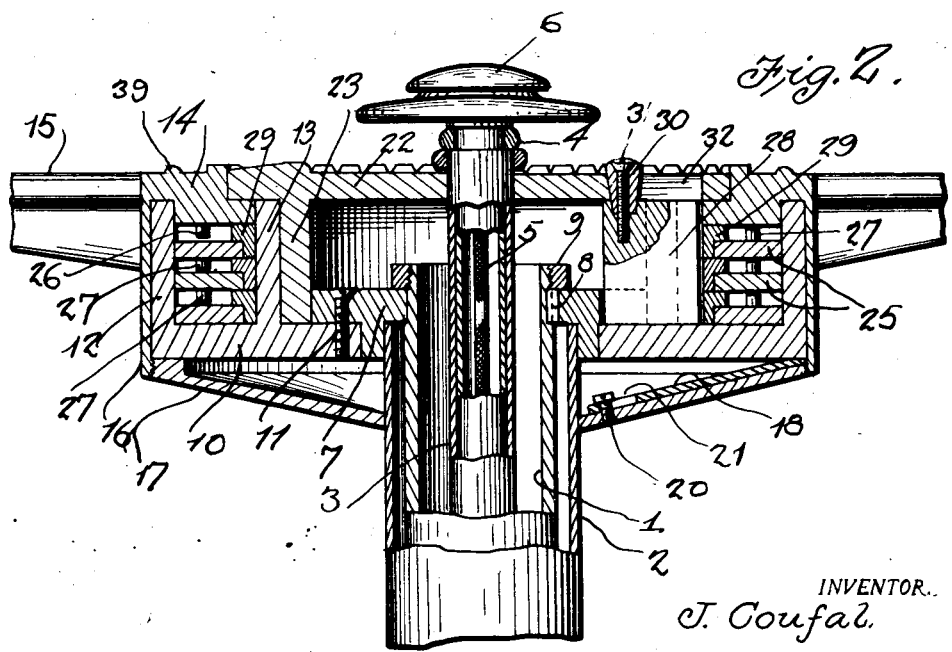
Figure 2 is a vertical cross-sectional view of the steering wheel hub showing the interior of the lock casing and the operating means for the ring tumbler key at the upper side of the steering wheel hub.

A circular key block 7 rotatable upon the upper end of the column 2 is keyed as at 8 to the steering post 1 and is retained in position by the nut 9 threaded upon the upper end of the post 1, this construction being illustrated in Figure 2. The lock casing comprises a part of the steering wheel, the bottom wall of the lock casing having a bottom disk plate 10 that has a central opening to receive the circular block 7 and is retained and is connected thereto by the screw 11. The bottom disk plate 10 carries an upwardly directed annular wall 12 at its peripheral edge and an inner concentric upstanding annular wall 13 spaced from the wall 12. The steering wheel comprises a hub ring 14 carrying the usual spider arms 15, the hub ring 14 being disposed above the bottom disk plate 10 between the spaced annular walls 12 and 13 and carrying a depending annular skirt 16 that rotatably incloses the outer angular wall 12. The skirt 16 depends below the bottom disk plate 10 and is internally threaded to receive threaded peripheral edge of the lower plate 17 that is retained in adjusted position by the locking arm 18 having its outer end projected into the socket 19 provided in the inner face of the skirt 16 and there retained by the screw 20 passing through the arm slots 21 and threaded into the plate 17. The plate 17 forms the finishing wall for the bottom of the lock casing.

The lock casing further comprises a top disk plate 22 having a central opening therein received on the tubular shaft 3 and a depending annular wall 23 positioned inwardly of the upstanding annular wall 13 upon the bottom disk plate 10 with the lower edge thereof resting upon said plate, the outer edge of the disk plate 22 outwardly of the depending annular wall 23 resting upon the upper edge of the annular wall 13 and an annular recess provided in the hub ring 14, as shown in Figure 2. The disk plate 22 is anchored to the bottom disk plate 10 by the screw 24 shown in Figure 4 which passes through the disk plate 22 for reception in mating threaded cavities formed in the contiguous annular walls 13 and 23.

The steering wheel is adapted to have the hub ring 14 thereof locked to the annular wall 13 which is movable with the steering post 1 and to accomplish this connection, there is provided a plurality of tumbler rings at the peripheral edge and a manually shiftable locking key, or block. A plurality of tumbler rings 25 are rotatably mounted in the space between the spaced annular walls 12 and 13 of the bottom disk plate 10 and the hub ring 14, the hub ring having depending pins 26 engageable with pins 27 on the rings 25 for shifting the latter to dispose split portions thereof in line with a split or opening in the wall 13 to receive the interlocking key or block 28. The tumbler rings 25 are held in spaced relation by the spacer rings 29 and by rotating the hub ring 14 of the steering wheel in reverse directions with reference to the permutation characters upon the hub ring and disk plate 22, the several tumbler rings 25 are so disposed as to have the split portions thereof alined with the splits or slots in the wall 13, it being noted that when the block 28 is retracted as shown in Figure 2, the same is disposed inwardly of the wall 13 and moves through a slot in the wall 23.

The sliding block 28 is operable at the upper side of the steering wheel, the upper end of the block 28 having an operating button 30 secured thereto by the screw 31, the bottom extending through the radial slot 32 provided in the disk plate 22. The head 30 projecting above the disk plate 22 has a device associated therewith for holding the block 28 and head 30 in shifted position when the block is interlockingly engaged with the tumbler ring and wall 13, such device comprising a latch 33 pivotally mounted as at 34 upon the upper face of the disk plate 22 and tensioned by the spring washer 35 with a finger-piece 36 on its free end. When the block and head are shifted to the dotted line position shown in Figure 1, the latch 33 is also moved to the dotted line position to dispose the nose 33ª thereof rearwardly of the head 30. The block 28 is then securely retained in its shifted position with the steering wheel comprising the hub ring 14 locked to the wall 13 which is in turn anchored to the steering post 1.

The permutation characters are carried by the hub ring 14, the zero point or starting arrow 37 being carried by the disk plate 22 while the graduations 38 on the hub ring 14 comprise a series of lugs 38ª, while the zero point or arrow 37 is embossed to be perceptible to touch. The dial is illustrated as being graduated to one hundred and at intervals of ten, the hub ring 14 is provided with knobs 39. By the provision of the lugs 38ª representing the graduation lines and the knobs 39 at intervals of ten, it is possible to solve combination of the lock mechanism when the combination is known without seeing the dial plate.

From the above detailed description of the invention, it is believed that the construction and operation thereof will at once be apparent, and while there is herein shown and described the preferred embodiment of the present invention, it is nevertheless to be understood that minor changes may be made therein without departing from the spirit and scope of the invention as claimed.

What I claim as new is:—

1. In a lock for automobile steering wheels, a steering post, a steering wheel journalled thereon and permutation controlled lock devices interposed between the post and steering wheel for anchoring the wheel to the post, a bottom finishing wall for the casing and a sliding locking strip carried by the wall and engaged with the casing.

2. In a lock for automobile steering wheels, a steering post, a steering wheel journalled thereon and permutation controlled lock devices interposed between the post and steering wheel for anchoring the wheel to the post, a part of the lock device comprising a sliding block operable at the upper side of the steering wheel, a head on the block disposed above the steering wheel and a tensioned pivoted catch movable into engagement with the head for holding the block in its shifted position.

In testimony whereof I affix my signature.

JOHN COUFAL.